F. E. HEWITT.
ELECTRIC TOASTER.
APPLICATION FILED FEB. 24, 1912.
1,049,359.
Patented Jan. 7, 1913.
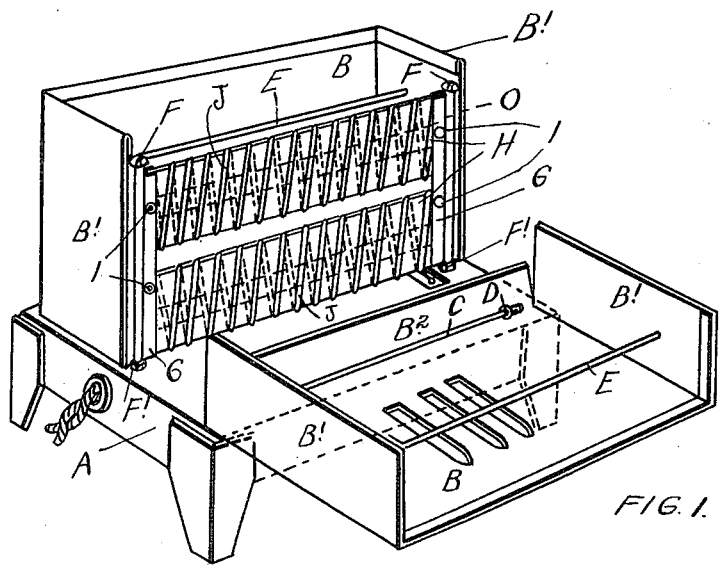
FIG. 1.
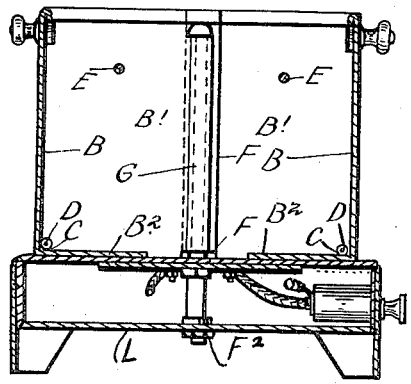
FIG. 2.
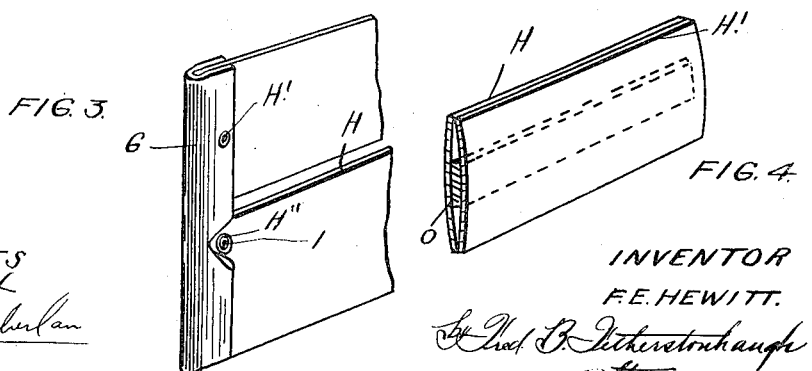
FIG. 3.
FIG. 4.
WITNESSES
INVENTOR
F.E. HEWITT.

UNITED STATES PATENT OFFICE.

FRANK ERNE HEWITT, OF TORONTO, ONTARIO, CANADA.

ELECTRIC TOASTER.

1,049,359.　　　　　Specification of Letters Patent.　　Patented Jan. 7, 1913.

Application filed February 24, 1912. Serial No. 679,583.

*To all whom it may concern:*

Be it known that I, FRANK ERNE HEWITT, of the city of Toronto, in the county of York, in the Province of Ontario, Canada, have invented certain new and useful Improvements in Electric Toasters, of which the following is the specification.

My invention relates to improvements in electric toasters and the object of the invention is to devise a simple and effective toaster and one that may be constructed more cheaply than those at present in use as well as being more efficient.

A further object is to construct an electric toaster wherein the heat radiated from the heating elements is deflected back on the bread to be toasted.

A still further object is to construct the heating elements in such a way that the tendency to bend under the influence of the heat will be obviated.

To more particularly describe my invention I will refer to the accompanying drawings in which:

Figure 1, represents a perspective view of the toaster. Fig. 2, is a cross section through the same, and Fig. 3, is a perspective detail of the mica strips upon which the coils of wire are wound showing the mode of connection to the U-shaped end portions which are mounted on the vertical bolts. Fig. 4, is a perspective detail of the heating units with the iron bar inserted between the layers of mica the ends of the same being shown in section.

Like letters of reference indicate corresponding parts in each figure.

A is the base of the toaster provided with suitable legs.

B are the toast receptacles hinged on the base A and provided with inwardly extending end portions B' designed to overlap each other when the receptacles are in the vertical position, the hinges for the receptacles being formed by the rods C extending through the cotter pins D, the said cotter pins extending through apertures in the portions B² and the ends bent over again at the bottom side of the base A.

B² are portions of receptacles B being bent at right angles thereto and designed to hold the bread.

E are rods extending between the portions B' and designed to prevent the bread from falling over against the heating element while being toasted.

F are vertical bolts provided with suitable nuts F' designed to secure the bolts to the base A.

G are U-shaped metal portions designed to hold the heat resisting strips H and H' to the bolts F.

I are rivets extending through the U-shaped portions and through holes H'' in the heat resisting strips H and H', said holes being of slightly larger diameter than the diameter of the rivets I to allow for the expansion of the heat resisting material, such as mica, and prevent the same from buckling due to this expansion as would occur if the mica plates were rigidly attached to the U-shaped portions.

O is an iron bar inserted between the two layers H and H' of heat resisting material extending for part of the length thereof, said bar being held in place by the coils of ribbon wire referred to below.

J are coils of ribbon wire wound upon the mica strips or plates H.

K is a pad of heat non-conducting material, such as asbestos, held below the base A by the nuts F' on the bolt F.

L is a bottom plate for the base designed to inclose the connecting wires and switch, and held in place by having apertures therein designed to register with the bolts F and held on to the said bolts by the nuts F².

It will be seen that a device constructed according to my invention will possess numerous advantages over the electric toasters now in use. The bread will be more readily and quickly toasted than with the ordinary forms of electric toaster; also the liability to burn one's fingers when removing the toast from the toaster will be done away with as the portions B, containing the toast can be drawn down out of reach of the heating element. Also the bread to be toasted may be put into the receptacles B when they are in a horizontal position and then turned into a vertical position to be toasted. The mica strips H which hold the wire J will not have the tendency to buckle as occurs in the ordinary toaster and which causes the bread to burn instead of toasting evenly. Further by simply removing the nuts F' heat elements may be removed and others replaced should they prove defective, and a further advantage is the simplicity with which the whole device may be constructed. Also the iron bar being inserted between the heat resisting strips and held in place by the ribbon wire materially reduces the current consumption and hence tends toward economy.

Many modifications may be made in my invention without departing from the spirit or scope of the claims and the form shown is to be taken in an illustrative and not in a limiting sense.

What I claim as my invention is:

1. An electric toaster comprising a heating element consisting of strips or plates of heat resisting material, standards of U-shaped cross section, rivets securing the U-shaped standards to the heat resisting material, said rivets extending through apertures in the heat resisting material of slightly larger diameter than the diameter of the rivets, coils of wire wound on the heat resisting material, means for securing the heating element to the base of the toaster and means for holding the bread whereby it is moved into horizontal position for inserting and for withdrawing and into a vertical position for toasting, substantially as described.

2. An electric toaster comprising a heating element consisting of heat resisting strips, standards of U-shaped cross section, rivets securing the U-shaped standards to the heat resisting material, said rivets extending through apertures in the heat resisting material, of slightly larger diameter than the diameter of the rivets, coils of wire wound on the heat resisting strips, bolts extending through the U-shaped standards and secured to the base of the toaster and receptacles suitably hinged to the base of the toaster and having end and bottom portions bent at right angles to the main portions of the receptacles and rods extending across the end portions substantially as described.

3. An electric toaster comprising a heating element consisting of heat resisting strips, standards of U-shaped cross section, rivets securing the U-shaped standards to the heat resisting material, said rivets extending through apertures in the heat resisting material of slightly larger diameter than the diameter of the rivets, coils of wire wound on the heat resisting strips, bolts extending through the U-shaped standards and secured to the base of the toaster, and receptacles, hinges for the receptacles consisting of a lateral rod, end and bottom portions on said receptacles bent at right angles to the hinged portions, and rods extending across the end portions, cotter pins extending through the apertures in the bottom of the right angled portions and through the base of the toaster, and clenched below the latter, said rods extending through the heads of the cotter pins, substantially as described.

4. An electric toaster comprising a heating element, standards of U-shaped cross section for receiving the ends of the heating element, and means for holding the bread whereby it is moved into a horizontal position for inserting and for withdrawing and into a vertical position for toasting, substantially as described.

FRANK ERNE HEWITT.

Witnesses:
B. BOYD,
G. F. CHAMBERLAIN.